(12) United States Patent  (10) Patent No.: US 7,881,864 B2
Smith  (45) Date of Patent: Feb. 1, 2011

(54) METHOD AND APPARATUS FOR UTILIZING GEOGRAPHIC LOCATION INFORMATION

(75) Inventor: David A. Smith, Olathe, KS (US)

(73) Assignee: Garmin Switzerland GmbH (CH)

(*) Notice: Subject to any disclaimer, the term of this patent is extended or adjusted under 35 U.S.C. 154(b) by 1135 days.

(21) Appl. No.: 11/421,339

(22) Filed: May 31, 2006

(65) Prior Publication Data

US 2007/0282526 A1 Dec. 6, 2007

(51) Int. Cl.
*G01C 21/30* (2006.01)
*G01C 21/32* (2006.01)

(52) U.S. Cl. .................. 701/211; 701/207; 701/208; 715/230; 715/764; 707/999.102; 707/732

(58) Field of Classification Search ............ 701/200, 701/201–213; 715/764, 781, 968, 230; 707/E17.142, 707/E17.019, E17.018, 999.102, 732; 340/995.14
See application file for complete search history.

(56) References Cited

U.S. PATENT DOCUMENTS

| | | | |
|---|---|---|---|
| 6,119,014 A | | 9/2000 | Alperovich et al. |
| 6,163,749 A * | | 12/2000 | McDonough et al. ....... 701/208 |
| 6,307,573 B1 * | | 10/2001 | Barros ........................ 715/764 |
| 6,321,158 B1 | | 11/2001 | DeLorme et al. |
| 6,329,904 B1 | | 12/2001 | Lamb |
| 6,356,761 B1 | | 3/2002 | Huttunen et al. |
| 6,360,101 B1 | | 3/2002 | Irvin |
| 6,377,793 B1 | | 4/2002 | Jenkins |
| 6,480,713 B2 | | 11/2002 | Jenkins |
| 6,633,809 B1 | | 10/2003 | Aizono et al. |
| 6,681,107 B2 | | 1/2004 | Jenkins et al. |
| 6,810,323 B1 | | 10/2004 | Bullock et al. |
| 6,829,532 B2 | | 12/2004 | Obradovich et al. |
| 7,036,085 B2 * | | 4/2006 | Barros ........................ 715/764 |
| 7,321,826 B2 | | 1/2008 | Sheha et al. ................ 701/209 |
| 7,450,003 B2 * | | 11/2008 | Weber et al. ............. 340/539.2 |
| 7,533,084 B2 * | | 5/2009 | Holloway et al. .................. 1/1 |
| 7,624,101 B2 * | | 11/2009 | Lin et al. ........................ 707/3 |
| 7,634,463 B1 * | | 12/2009 | Katragadda et al. ............ 707/3 |
| 7,685,144 B1 * | | 3/2010 | Katragadda .......... 707/999.101 |
| 2005/0080786 A1 | | 4/2005 | Fish et al. |
| 2005/0130671 A1 | | 6/2005 | Frank et al. |
| 2005/0278371 A1 * | | 12/2005 | Funk et al. ................... 707/102 |
| 2007/0016651 A1 * | | 1/2007 | Blagsvedt et al. ........... 709/217 |

(Continued)

OTHER PUBLICATIONS

Geographical Mashups [review of Google Maps Hacks (Gibson, R. and Erle, S.; 2006]; Curran, Kevin; Distributed Systems Online, IEEE; vol. 8, Issue 4, Apr. 2007 pp. 5-5; Digital Object Identifier 10.1109/MDSO.2007.20.*

(Continued)

*Primary Examiner*—Cuong H Nguyen
(74) *Attorney, Agent, or Firm*—Samuel M. Korte (57) ABSTRACT

Embodiments of the present invention provide navigation devices (10) and methods for receiving and/or forming geoblogs. The provided navigation devices (10) are generally operable to retrieve a geoblog utilizing the current geographic location of the device (10) and a user input, form a geoblog utilizing the current geographic location of the device (10) and selected pre-defined comment, and/or automatically title a geoblog utilizing a current geographic location of the device (10). Such configurations and variations thereof enable users to easily share information related to a geographic location.

6 Claims, 5 Drawing Sheets

U.S. PATENT DOCUMENTS

| | | | |
|---|---|---|---|
| 2007/0112735 A1* | 5/2007 | Holloway et al. | 707/3 |
| 2007/0130126 A1* | 6/2007 | Lucovsky et al. | 707/3 |
| 2007/0198340 A1* | 8/2007 | Lucovsky et al. | 705/14 |
| 2007/0198500 A1* | 8/2007 | Lucovsky et al. | 707/4 |
| 2007/0203644 A1* | 8/2007 | Thota et al. | 701/211 |
| 2007/0282526 A1* | 12/2007 | Smith | 701/211 |
| 2009/0217149 A1* | 8/2009 | Kamien et al. | 715/230 |
| 2010/0035631 A1* | 2/2010 | Doucette et al. | 455/456.1 |

OTHER PUBLICATIONS

On Automatic Contextual Metadata Generation for Personal Digital Photographs; Sarin, S.; Nagahashi, T.; Miyosawa, T.; Kameyama, W.;; Advanced Communication Technology, The 9th International Conference on; vol. 1, Feb. 12-14, 2007 pp. 66-71; Digital Object Identifier 10.1109/ICACT.2007.358306.*

MIT GEOblog: A platform for digital annotation of space for collective community based digital story telling; Nabian, N.; Ratti, C.; Biderman, A.; Grise, G.; Digital Ecosystems and Technologies, 2009. DEST '09. 3rd IEEE International Conference on; Jun. 1-3, 2009 pp.353-358; Digital Object Identifier 10.1109/DEST.2009.5276771.*

Frank Allen Hansen et al., Integrating the Web and the World: Contextual Trails on the Move, Copyright 2004 ACM 1-58113-848-2/04/0008; HT'04, Aug. 9-13, 2004, Santa Cruz, California, USA.*

A Google-earth based test bed for structural image-based UAV navigation; Michaelsen, E.; Jaeger, K.; Information Fusion, 2009. Fusion '09. 12th International Conference on; Publication Year: 2009 , pp. 340-346.*

Location tracking in GPS using Kalman Filter through SMS; Zahaby, M.; Gaonjur, P.; Farajian, S.; EUROCON 2009, EUROCON '09. IEEE; Digital Object Identifier: 10.1109/EUROCON.2009.5167873; Publication Year: 2009 , pp. 1707-1711.*

Taking Online Maps Down to Street Level; Vincent, L.; Computer ; vol. 40 , Issue: 12; Digital Object Identifier: 10.1109/MC.2007.442 ; Publication Year: 2007 , pp. 118-120.*

Describing Web pages better in search results; Deepak, P.; Jyothi John; Information and Communication Technologies: From Theory to Applications, 2004. Proceedings. 2004 International Conference on; Digital Object Identifier: 10.1109/ICTTA.2004.1307922; Publication Year: 2004 , pp. 629-630.*

The anatomy of a hierarchical clustering engine for Web-page, news and book snippets; Ferragina, P.; Gulli, A.; Data Mining, 2004. ICDM '04. Fourth IEEE International Conference on; Digital Object Identifier: 10.1109/ICDM.2004.10027; Publication Year: 2004 , pp. 395-398.*

Mobile Guardian: A novel positioning and monitoring system for outdoor special users based on GPS; Qingfeng Wu; Xianyan Yang; Han Liu; Huailin Dong; IT in Medicine and Education, 2008. ITME 2008. IEEE International Symposium on Digital Object Identifier: 10.1109/ITME.2008.4743934; Publication Year: 2008 , pp. 596-600.*

Integration of web 2.0 with automotive user interfaces via nomadic devices; Gil-Castineira, F.; Chaves-Dieguez, D.; Gonzalez-Castano, J.; Costa-Montenegro, E.; Consumer Electronics, 2009. ICCE '09. Digest of Technical Papers International Conference on; Digital Object Identifier: 10.1109/ICCE.2009.5012371; Publication Year: 2009 , pp. 1-2.*

Geospatial Information System for tracking and navigation of mobile objects; Alahakone, A.U.; Ragavan, V.; Advanced Intelligent Mechatronics, 2009. AIM 2009. IEEE/ASME International Conference on; Digital Object Identifier: 10.1109/AIM.2009.5229899; Publication Year: 2009 , pp. 875-880.*

Privacy enhancements for mobile and social uses of consumer electronics; Falchuk, B.; Loeb, S.; Communications Magazine, IEEE; vol. 48 , Issue: 6; Digital Object Identifier: 10.1109/MCOM.2010.5473870 ; Publication Year: 2010 , pp. 102-108.*

Localization Information Retrieval Exploiting Cooperation Among Mobile Devices; Sammarco, C.; Fitzek, F.H.P.; Perrucci, G.P.; Iera, A.; Molinaro, A.; Communications Workshops, 2008. ICC Workshops '08. IEEE International Conference on; Digital Object Identifier: 10.1109/ICCW.2008.33; Publication Year: 2008 , pp. 149-153.*

Integrated Tourist Navigation System; Haomian Wang; Weiwei Cui; Hong Zhou; Yingcai Wu; Huamin Qu; Computer Graphics, Imaging and Visualization, 2009. CGIV '09. Sixth International Conference on; Digital Object Identifier: 10.1109/CGIV.2009.45 Publication Year: 2009 , pp. 497-502.*

More than Just an Internet Hype: Added Value with Spatial-Enabled Enterprise Applications; Czarski, C.; Enterprise Distributed Object Computing Conference, 2008. EDOC '08. 12th International IEEE; Digital Object Identifier: 10.1109/EDOC.2008.66 Publication Year: 2008 , pp. xxv-xxv.*

Nabian et al., "MIT GEOblog: A Platform for Digital Annotation of Space for Collective Community Based Digital Story Telling", 2009 $3^{rd}$ IEEE Inter. Conf. on Digital Ecosystems and Technologies, 6 pages.* http://gis-geoblog.blogspot.com/search?updated-min=2005-01-01T00%3A00%3A00-06%3A00&updated-m.., this site is about geoblogs.*

MIT GEOblog: A platform for digital annotation of space for collective community based digital story telling; Nabian, N.; Ratti, C.; Biderman, A.; Grise, G.; Digital Ecosystems and Technologies, 2009. DEST '09. 3rd IEEE International Conference on Digital Object Identifier: 10.1109/DEST.2009.5276771; Publication Year: 2009 , pp. 353-358.*

Burrell, Jenna et al., "Context-Aware Computing: A Test Case", Intel Corporation, 16 pages.

Espinoza, Fredrik et al., "Geonotes: Social and Navigational Aspects of Location-Based Information Systems", in Abowd, Brumitt & Shafer (eds.) Ubicomp 2001: Ubiquitous Computing, International Conference Atlanta, Georgia, Sep. 20-Oct. 2, Berlin: Springer, p. 2-17, (2001).

Printout from http://confluence.rave.ac.uk/confluence/display/SCIRC/Geo-Blogging , 5 pages, Published before May 31, 2006.

Mankins, Matthew, "Location Linked Information", Massachusetts Institute of Technology, 99 pages, (2003).

* cited by examiner

METHOD AND APPARATUS FOR UTILIZING GEOGRAPHIC LOCATION INFORMATION

BACKGROUND OF THE INVENTION

1. Field of the Invention

The present invention relates to navigation devices and methods of using geographic location information. More particularly, the invention relates to navigation devices and methods that enable users to receive and/or form geoblogs.

2. Description of the Related Art

Navigation devices are becoming increasingly popular due to their many beneficial features. For example, navigation devices commonly utilize the Global Positioning System (GPS) to calculate an accurate current geographic location based on received GPS signals. Due to the rising popularity of navigation devices and the ease in which geographic locations may be accurately identified, navigation device users often seek to share information regarding interesting or important geographic locations.

One method of sharing geographic location information is to create or publish a geoblog. As is known in the art, a blog (web log) is a comment available for viewing through a communications network, such as the Internet, while a geoblog is a blog that relates to a geographic location. Unfortunately, it is often difficult or impossible for users to easily create geoblogs with their navigation devices, as users are typically required to first relay information from the navigation devices to their personal computers. Similarly, navigation devices are also generally unable to effectively utilize information provided by existing geoblogs, as users are generally required to receive and view geoblogs on computing devices separate from their navigation devices.

SUMMARY OF THE INVENTION

The present invention solves the above-described problems and provides a distinct advance in the art of utilizing geographic location information. More particularly, the invention provides navigation devices and methods that enable users to receive and/or form geoblogs for easy sharing of geographic location information.

In one embodiment, the present invention provides a navigation device including a location determining component operable to determine a current geographic location of the device, a user interface operable to receive a user input, a processor, and a display. The processor is operable to retrieve a geoblog utilizing the current geographic location of the device and the user input and the display is operable to present a representation of at least a portion of the retrieved geoblog.

In another embodiment, the present invention provides a method of retrieving a geoblog. The method generally includes acquiring an input from a user and a current geographic location of the user, retrieving a geoblog utilizing the current geographic location and the user input, and presenting a representation of at least a portion of the retrieved geoblog.

In another embodiment, the present invention provides a navigation device including a location determining component operable to determine a current geographic location of the device, a display operable to present a listing of a plurality of pre-defined comments, a user interface operable to be functioned by a user to select one of the presented pre-defined comments, and a processor. The processor is operable to form a geoblog utilizing the current geographic location of the device and the selected pre-defined comment.

In another embodiment, the present invention provides a method of forming a geoblog. The method generally includes acquiring a current geographic location of a user, presenting a listing of a plurality of pre-defined comments, receiving an input from the user corresponding to a selected one of the presented pre-defined comments, and forming a geoblog utilizing the current geographic location and the selected pre-defined comment.

In another embodiment, the present invention provides a navigation device including a location determining component operable to determine a current geographic location of the device, a memory including a database of geographic entities, each geographic entity including a geographic location and a name; and a processor coupled with the location determining component and the memory. The processor is operable to identify at least one geographic entity that corresponds to the current geographic location of the device, form a geoblog utilizing the current geographic location of the device, and automatically title the formed geoblog utilizing the name of the identified geographic entity.

In another embodiment, the present invention provides a method of forming a geoblog. The method generally includes acquiring a current geographic location of a user, identifying at least one geographic entity that corresponds to the current geographic location of the user, the geographic entity including a geographic location and a name, and forming a geoblog utilizing the current geographic location of the user and automatically titling the formed geoblog utilizing the name of the identified geographic entity.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
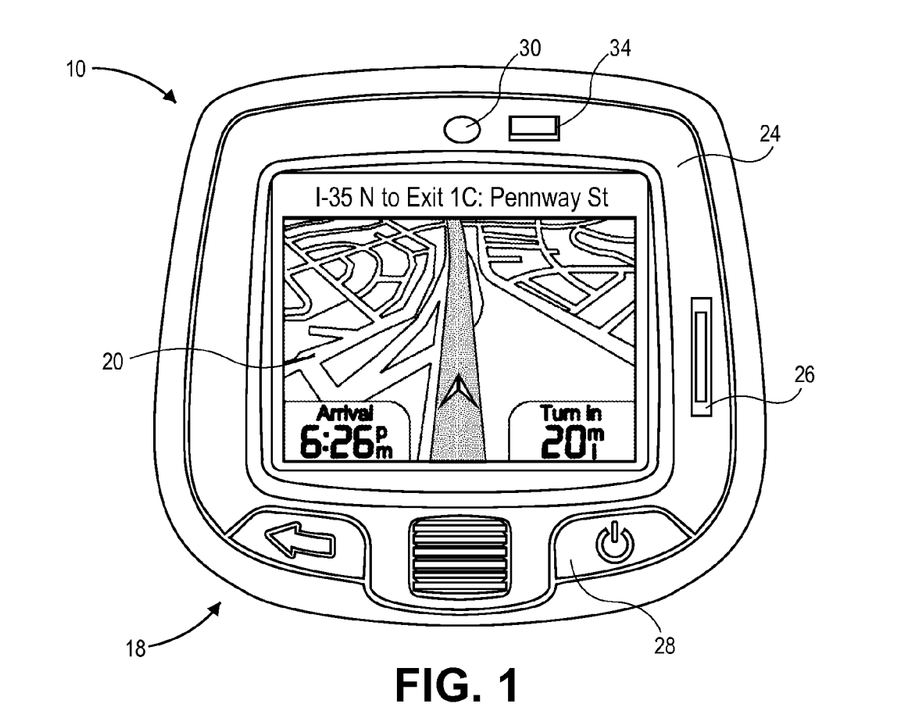
FIG. 1 is a front view of a navigation device configured in accordance with various preferred embodiments of the present invention.
Figure 2:
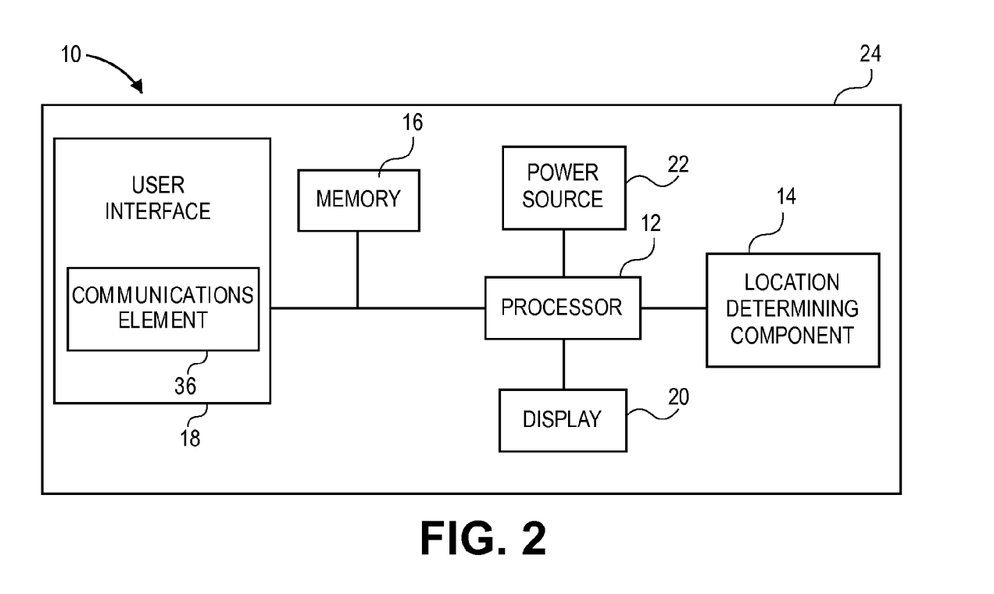
FIG. 2 is a block diagram of certain components of the navigation device of FIG. 1.

As shown in FIGS. 1-2, the present invention is preferably implemented utilizing a navigation device 10. The device 10 may be any electronic device operable to receive, utilize, or determine geographic information, such as a current geographic location. Thus, the device 10 may include computers, televisions, radios, portable computing devices such as laptops or personal data assistants (PDAs), cellular telephones, portable entertainment devices, etc. More preferably, the device 10 is a navigation device manufactured by GARMIN INTERNATIONAL, INC. of Olathe, Kans. However, the device 10 may be any device configured as described herein or otherwise operable to perform the functions described below.

The device 10 preferably includes a processor 12, a location determining component 14 coupled with the processor 12 to facilitate determination of a current geographic location, a memory 16 coupled with the processor 12 and operable to store information, a user interface 18 coupled with the processor 12 and operable to communicate with a user and a communications network, a display 20 and power source 22 each coupled with the processor 12, and a housing 24 for housing the various components of the device 10.

The processor 12 is preferably coupled with the user interface 18, location determining component 14, memory 16, and display 20, through wired or wireless connections, such as a data bus, to enable information to be exchanged between the various elements. Further, the processor 12 is preferably operable to control the various functions of the device 10 according to a computer program, including one or more code segments, or other instructions associated with the memory 16 or with various processor logic and structure. The processor 12 may comprise various computing elements, such as integrated circuits, microcontrollers, microprocessors, programmable logic devices, etc, alone or in combination, to perform the operations described herein.

As described below in more detail, the processor 12 may determine a current geographic location of the device 10 by receiving the geographic location from the location determining component 14 or from another device through the user interface 18. Alternatively, the processor 12 may independently determine geographic locations based on information and/or data, such as received navigation signals, provided by the location determining component 14, stored within the memory 16, or acquired from other devices or elements.

The location determining component 14 is coupled with the processor 12 to facilitate determination of geographic locations including a current location of the device 10. The location determining component 14 is not required in all embodiments as the processor 12 may retrieve geographic information from other sources such as the user interface 18 or through internal data stored within the memory 16. However, the location determining component 14 is preferably coupled with the processor 12 to enable rapid and accurate geographic location determination.

The location determining component 14 is preferably a Global Positioning System (GPS) receiver, and is adapted to provide, in a substantially conventional manner, geographic location information for the device 10. The location determining component 14 may be, for example, a GPS receiver much like those disclosed in U.S. Pat. No. 6,434,485, which is incorporated herein by specific reference. However, the location determining component 14 may receive cellular or other positioning signals utilizing various methods to facilitate determination of geographic locations without being limited to GPS.

As is known in the art, the GPS is a satellite-based radio navigation system that allows determination of navigation information, such as position, velocity, time, and direction, for an unlimited number of users. Formally known as NAVSTAR, the GPS incorporates a plurality of satellites that orbit the earth.

The location determining component 14 scans for GPS satellite signals and, upon receiving signals from at least three different satellite signals, the location determining component 14 utilizes the three satellite signals to determine its own position. Acquiring a fourth satellite signal will allow the location determining component 14 to calculate its three-dimensional position by the same calculations. As should be appreciated, the processor 12 may be operable to perform one or more of these functions in place of the location determining component 14.

Although GPS enabled devices are often used to describe navigation devices, it will be appreciated that satellites need not be used to determine a geographic position of a receiving unit since any receiving device capable of receiving signals from multiple transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Figure 4:
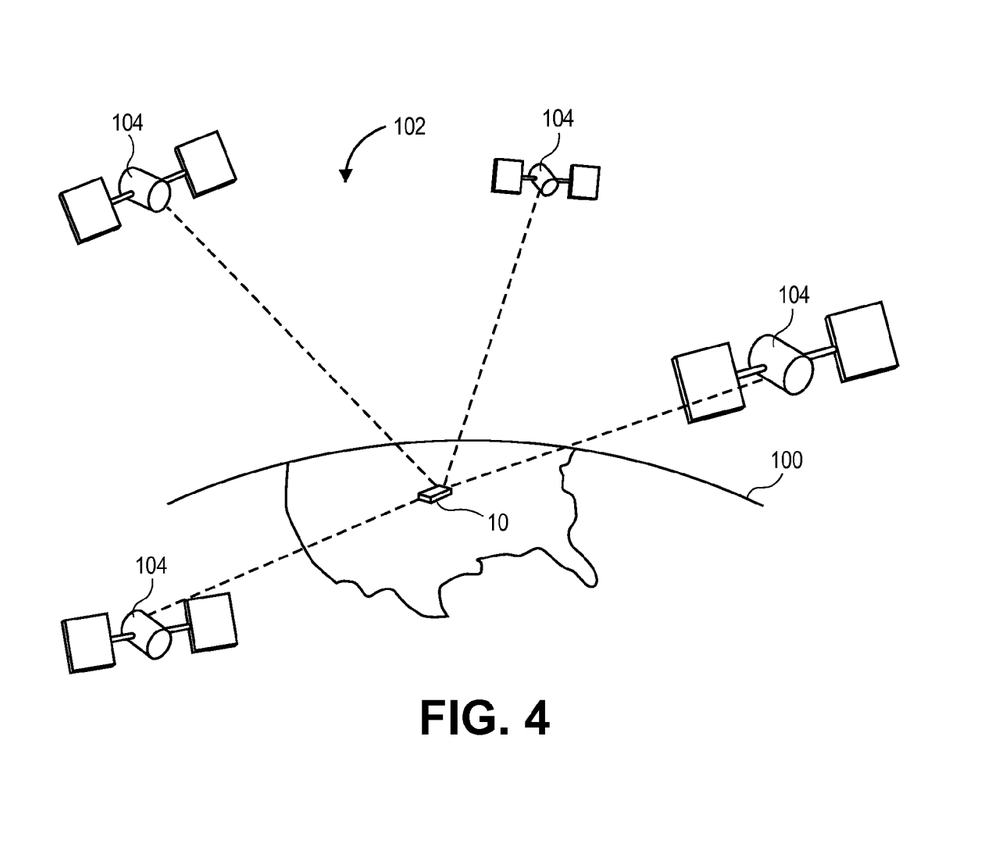
FIG. 4 is schematic diagram of a Global Positioning System (GPS) that may be utilized by various embodiments of the present invention.

FIG. 4 shows one representative view of a GPS denoted generally by reference numeral 102. A plurality of satellites 104 are in orbit about the Earth 100. The orbit of each satellite is not necessarily synchronous with the orbits of other satellites and, in fact, is likely asynchronous. The navigation device 10, including the location determining component 14, is shown receiving spread spectrum GPS satellite signals from the various satellites 104.

The location determining component 14 may also include various processing and memory elements to determine the geographic location of the device 10 itself or it may provide information to the processor 12 to enable the processor 12 to specifically determine the geographic location of the device 10. Thus, the location determining component 14 need not itself calculate the current geographic location of the device 10 based upon received signals. The location determining component 14 also may include an antenna for receiving signals, such as a GPS patch antenna or helical antenna.

Further, the location determining component 14 may be integral with the processor 12 and/or memory 16 such that the location determining component 14 may be operable to specifically perform the various functions described herein. Thus, the processor 12 and location determining component 14 need not be separate or otherwise discrete elements.

In various embodiments the location determining component 14 need not directly determine the current geographic location of the device 10. For instance, the location determining component 14 may determine the current geographic location utilizing the user interface 18, such as by receiving location information from the user, through the communications network, from another electronic device, etc.

The memory 16 is coupled with the processor 12 and/or other device 10 elements and is operable to store various data utilized by the processor 12 and/or other elements. The memory 16 may include removable and non-removable memory elements such as RAM, ROM, flash, magnetic, optical, USB memory devices, and/or other conventional memory elements.

Further, the memory 16 may comprise a portion of the user interface 18 to enable the user to provide information to the device 10 via the memory 16, such as by inserting a removable memory element into a slot 26 to provide information and instruction to the device 10. The memory 16 may also be integral with the processor 12, such as in embodiments where the memory 16 comprises internal cache memory.

The memory 16 may store various data associated with operation of the device 10, such as a computer program, code segments, or other data for instructing the processor 12 and other device 10 elements to perform the steps described below. Further, the memory 16 may store various cartographic data corresponding to geographic locations including security locations, map data, and map elements, such as thoroughfares, terrain, alert locations, points of interest, geographic entities, geoblogs and other navigation data to facilitate the various navigation functions provided by the device 10. Additionally, the memory 16 may store destination addresses and previously calculated or otherwise acquired routes to various destination addresses for later retrieval by the processor 12.

Further, the various data stored within the memory 16 may be associated within a database to facilitate processor 12 retrieval of information. For example, the database may be configured to enable the processor 12 to retrieve geographic locations, geographic entities, and geoblogs based upon a current geographic location of the device 10, as is discussed at length below.

The user interface 18 enables users, third parties, or other devices to share information with the device 10. The user interface 18 is generally associated with the housing 24, such as by physical connection through wires, etc., or wirelessly utilizing conventional wireless protocols. Thus, the user interface 18 need not be physically coupled with the housing 24.

The user interface 18 may comprise one or more functionable inputs 28 such as buttons, switches, scroll wheels, etc., a touch screen associated with the display 20, voice recognition elements such as a microphone 30, pointing devices such as mice, touchpads, trackballs, styluses, a camera 34 such as a digital or film still or video camera, combinations thereof, etc. Further, the user interface 18 may comprise wired or wireless data transfer elements such as removable memory including the memory 16, data transceivers, etc, to enable the user and other devices or parties to remotely interface with the device 10.

Figure 3:
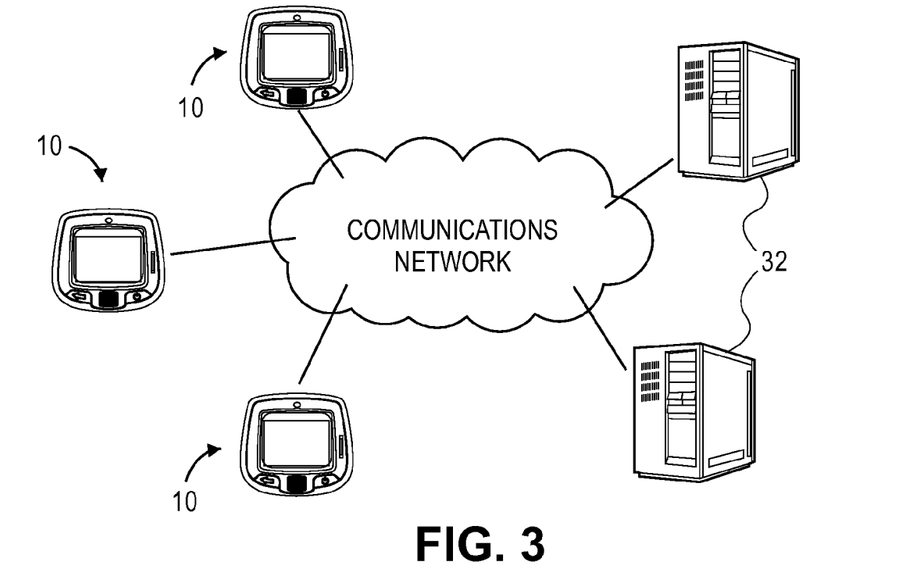
FIG. 3 is a block diagram showing the navigation device of FIGS. 1-2 coupled with a communications network.

As shown in FIGS. 2 and 3, the user interface 18 preferably includes a communications element 36 to enable the device 10 to communicate with external sources, such as other computing devices 32, navigation devices, and any other network enabled devices through the communication network, such as the Internet, a local area network, a wide area network, an ad hoc or peer to peer network, etc. However, the communications element 36 may be configured to only allow direct communication between similarly configured navigation devices, such that the device 10 need not necessarily utilize the communications network to share geographic location information. The communications element 36 may also be used to connect the device 10 directly to one of the computing devices 32, thereby allowing the device 10 to communicate with the communications network through the computing device 32.

In various embodiments the communications element 36 may enable the device 10 to wirelessly communicate with the communications network or other external sources utilizing wireless data transfer methods such as WiFi (802.11), Wi-Max, Bluetooth, ultra-wideband, infrared, cellular telephony, radio frequency, etc. However, the communications element 36 may couple with the communications network utilizing wired connections, such as an Ethernet or phone cable, and is not limited to wireless methods.

The user interface 18 is preferably operable to provide various information to the user utilizing the display 20 or other visual or audio elements such as a speaker. Thus, the user interface 18 enables the user and device 10 to exchange information relating to the device 10, including geoblogs, geographic entities, configuration, security information, preferences, route information, points of interests, alerts and alert notification, navigation information, waypoints, a destination address, etc.

The display 20 is coupled with the processor 12 and/or other device 10 elements and is operable to display various information corresponding to the device 10, such as geoblogs, maps, locations, and security information as is described below. The display 20 may comprise conventional black and white, monochrome, or color display elements including CRT, TFT, and LCD devices. Preferably, the display 20 is of sufficient size to enable the user to easily view the display 20 to receive presented information while in transit.

Further, as described above, the display 20 may comprise a portion of the user interface 18, such as in embodiments where the display 20 is a touch-screen display to enable the user to interact with the display 20 by touching or pointing at display areas to provide information to the device 10.

The power source 22 is associated with the housing 24 to provide electrical power to various device 10 elements. For example, the power source 22 is preferably directly or indirectly coupled with the user interface 18, location determining component 14, processor 12, memory 16, and/or display 20. The power source 22 may comprise conventional power supply elements, such as batteries, battery packs, etc. The power source 22 may also comprise power conduits, connectors, and receptacles operable to receive batteries, battery connectors, or power cables. For example, the power source 22 may include both a battery to enable portable operation and a power input for receiving power from an external source such as an automobile.

The housing 24 is preferably handheld or otherwise portable to facilitate transport of the device 10 between locations. In some embodiments, the housing 24 may be configured for mounting within or on an automobile in a generally conventional manner and may comprise generally conventional and durable materials, such as ABS, plastics, metals, etc, to protect the enclosed and associated elements.

In some embodiments, the device 10 may lack the location determining component 14 and portable housing 24 and be configured as a generally conventional computing element. Thus, in some embodiments the device 10 may comprise personal computers, desktop computers, servers, computing networks, personal digital assistants, laptops, cellular phones, portable entertainment and media devices, combinations thereof, etc., configured to perform one or more of the steps discussed below. For instance, the device 10 may comprise a server operable to execute a computer program or code segment to perform one or more of the below steps or portions thereof.

Figure 7:
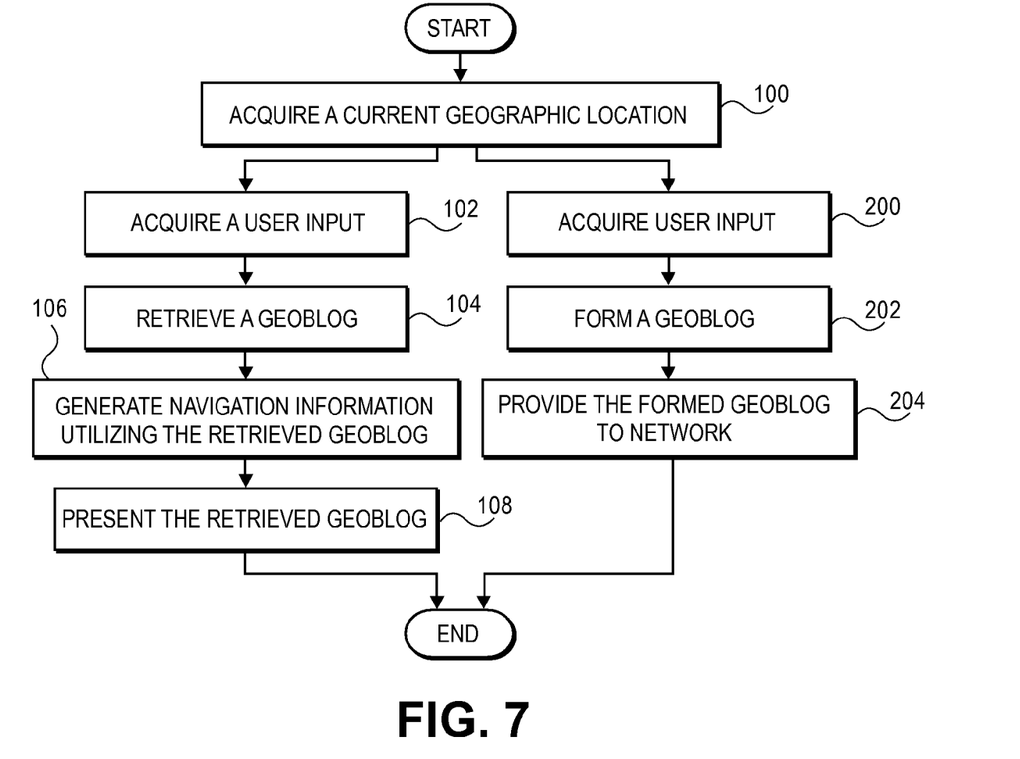
FIG. 7 is a flow chart showing some of the steps that may be performed by various embodiments of the present invention.

Steps 100-108 shown in FIG. 7 generally illustrate one method operable to be performed by various embodiments of the present invention. Steps 100-108 generally include: acquiring a current geographic location, referenced at step 100; acquiring a user input, referenced at step 102; retrieving a geoblog, referenced at step 104; generating navigation information utilizing the retrieved geoblog, referenced at step 106; and presenting the retrieved geoblog, referenced at step 108.

In step 100, the current geographic location is determined. Preferably, the determined current geographic location corresponds to the current geographic location of the device 10. However, in some embodiments the current geographic location may correspond to a user location independent of the device 10 location. The current geographic location of the device 10 is preferably determined as described above utilizing the location determining component 14. Thus, for instance, the current geographic location may be determined in step 100 by receiving GPS signals and computing the current geographic location from the received GPS signals.

However, as is also described above, the current geographic location may be determined utilizing other methods, such as by retrieving the current geographic location from the memory 16, the user interface 18, and/or the communications network. For example, the current geographic location may be determined by allowing the user to select his or her location from a map or listing presented by the display 20.

In some embodiments, the current geographic location acquired in step 100 may correspond to a current geographic location of the user that may be determined and/or acquired independent of the device 10. Thus, for example, the user may provide his or her current geographic location through the communications network for utilization by the computing devices 32 and/or directly input his or her current geographic location to the computing devices 32 utilizing conventional methods.

In step 102, the user input is acquired. In various embodiments, the user input is acquired utilizing the user interface 18. For example, the user may depress or function one of the inputs 28 to provide the user input, the device 10 may receive the user input through the communications network utilizing the communications element 36, the processor 12 may retrieve the user input from the memory 16, the user may provide the user input utilizing the slot 26 and/or microphone 30, etc. In other embodiments, the user input may be provided through the communications network for utilization by the computing devices 32 and/or the user input may be provided through direct input to the computing devices 32 utilizing conventional methods.

The user input acquired in step 102 generally corresponds to a desired geoblog criteria that may be utilized in step 104 to facilitate geoblog retrieval. For example, the user input may correspond to a geoblog category, a geographic range, a selected geoblog, a keyword, a rating, a popularity, combinations thereof, etc. The geoblog category generally indicates the category of geoblogs the user would like to access, view, and/or retrieve. Exemplary geoblog categories include food and drink, lodging, fuel, attractions, recreation, entertainment, etc. Thus, should the user desire to access geoblogs only relating to restaurants, the user may provide an input that selects or otherwise indicates the food and drink category.

The provided geographic range may generally indicate a range from the current geographic location in which the user would like to access, view, and/or retrieve geoblogs having corresponding geographic locations. For example, should the user desire to access geoblogs having geographic locations within 5 miles of the current geographic location acquired in step 100, the user may provide an input that indicates a desired geographic range of 5 miles.

The selected geoblog may generally indicate a particular geoblog that the user would like to access, view, and/or retrieve. For example, the user may be provided with a listing or selection of geoblogs utilizing the display 20 and/or the communications network, and the user may provide an input corresponding to a selected one of the listed geoblogs. Further, the user may be provided with a listing of a plurality of geoblogs that correspond to a particular location, and the user input may correspond to one or more of the listed geoblogs. In some embodiments, the user input may comprise a Uniform Resource Locator (URL) for identifying the selected geoblog.

The user input may also correspond to a keyword, a rating, and/or a popularity. For instance, the keyword may correspond to a particular location, such as a "BBQ", and/or it may correspond to a desired comment, such as "good food." The rating corresponds to a rating of a location and/or comment, such as 5-star restaurant or a 3-star geoblog, while popularity corresponds to the popularity of a geoblog, its location, and/or its associated comments, as indicated by the number of times the geoblog has been accessed or by associated user feedback.

The user input may also include a time indication, such as a current time of day, date, month, etc., that may be utilized in step 104 to retrieve related geoblogs. For instance, the time indication enables geoblogs to be retrieved that correspond to the indicated time, such that geoblogs corresponding to a particular time, such as a Friday evening concert, are only displayed at relevant times. The time indication may be provided by a user by manually providing the current or desired time and date and/or the time indication may be provided without user involvement by the device 10 utilizing an internal clock or timing mechanism.

Further, in some embodiments the user need not directly provide the user input. For instance, the user input may be automatically generated by the device 10 or other devices such as the computing devices 32 based upon previously provided user information. For example, the user may provide configuration or profile information from which the device 10 may automatically generate the user input and/or the user input may be automatically generated by the device 10 based upon previous user activity and/or locations recorded or detected by the device 10.

Further, the device 10 may provide the user input through the communications network for storage on remote devices, such as the computing devices 32, to enable the remote devices to utilize the stored user input to provide relevant geoblogs, such as by utilizing the stored user input, at least in part, to sort or search stored geoblogs.

In various embodiments, step 102 may be repeated to provide a plurality of user inputs. For instance, the user may function the user interface 18 at a first date to indicate a preference for BBQ restaurant geoblogs and then function the user interface 18 at a second date to search for BBQ restaurant geoblogs within five miles of the current geographic location of the device 10. Further, in various embodiments the user input may simply request a listing of all geoblogs.

As should be appreciated, the user input acquired in step 102 need not necessarily correspond to one of the above-identified inputs, as the user input may comprise any input or combination of inputs that may be utilized to facilitate retrieval of a geoblog. Further, in some embodiments it is not necessary to acquire a user input before retrieving a geoblog, as is discussed in more detail below.

In step 104, a geoblog is retrieved for access, use, and/or viewing by the user. "Geoblog", as utilized herein, is any information that comprises a stored geographic location and a user-provided comment that may be shared between at least two devices or users. The stored geographic location may include a latitude and longitude, a mailing or street address, a geographic area, combinations thereof, etc.

The user-provided comment may include any information provided or generated by a human that corresponds to the stored geographic location. For instance, the user-provided comment may include pre-defined comments, free-form text, images such as photographs and videos, sounds and audio information including spoken words and music, combinations thereof, etc. An exemplary geoblog is displayed in FIG. 5 that includes a stored geographic location, 39° 7' N, 94° 35' W, and a user-provided comment that includes a restaurant star rating, text description, and two photos.

Figure 5:
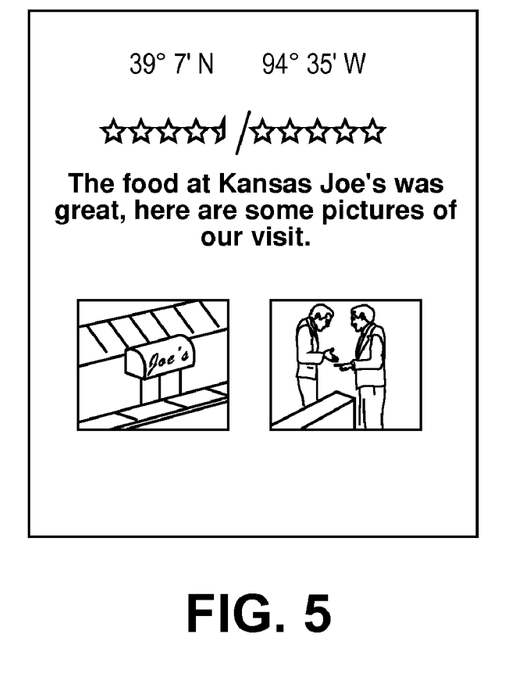
FIG. 5 is a block diagram of a geoblog operable to be displayed, retrieved, and/or formed by various embodiments of the present invention.

As should be appreciated, the restaurant geoblog presented by FIG. 5 is merely an example a geoblog that may be formed, retrieved, or otherwise utilized by the various embodiments of the present invention. Other exemplary geoblogs that may be utilized by embodiments of the present invention include golf course geoblogs that provide tips, pictures, and discussion of various holes, greens, fairways, etc., a photography geoblog including pictures, video, or other content relating to a scenic location, a concert geoblog including pictures and audio relating to an upcoming concert, a virtual geocash geoblog, etc. The geoblogs utilized by the various embodiments of the present invention may include any data that relates to a stored geographic location and a user-provided comment, and are not limited to the specific examples provided herein.

The device 10 may retrieve the geoblog through the communications network from external sources, such as other electronic devices, including other navigation devices and computing devices such as the computing devices 32. As the geoblogs utilized by various embodiments of the present invention are preferably provided in a readily sharable and conventional format, such as the hypertext markup language (HTML) or other widely used languages, formats, and data structures, the device 10 may retrieve the geoblog from any device or platform, such as from a web page or any other online or network accessible source. Further, the device 10 may retrieve a single geoblog as it is not necessary for the device 10 to retrieve a collection or complete database of geoblogs to enable the functionality described below. However, the device 10 is operable to retrieve any combination of geoblogs, including entire databases of geoblogs.

The device 10 may also or alternatively retrieve the geoblog from the memory 16 and need not rely on the communications network for retrieval. For instance, the memory 16 may include a database of geoblogs and the processor 12 may retrieve one or more of the geoblogs stored within the memory 16. Further, the device 10 may retrieve geoblogs through the communications network as described above, store the retrieved geoblogs within the memory 16, and then retrieve the geoblogs from the memory 16 concurrently or at a later time.

The device 10 may retrieve geoblogs independent of the user input or current geographic location of the device. For instance, the device 10 may retrieve all available geoblogs from a particular source or combination of sources. However, the geoblog is preferably retrieved utilizing both the current geographic location acquired in step 100 and the user input acquired in step 102.

In various embodiments, the device 10 may retrieve the geoblog from one of the computing devices 32 through the communication network according to both the current geographic location and user input. For instance, the processor 12 may access one or more of the computing devices 32, or other devices and content associated with the communications network, having a plurality of geoblogs stored thereon, search or sort the stored geoblogs according to current geographic location and the user input, and retrieve one or more of the geoblogs that generally correspond to the current geographic location and the user input.

The retrieved geoblogs need not directly correspond to the current geographic location of the device and the provided user input. For instance, a geoblog's stored geographic location may correspond to an area, a region, a plurality of locations, a route, etc, such that any geoblog corresponding to an area including or otherwise relating to the current geographic location of the device 10 may be retrieved. Similarly, the retrieved geoblog need only generally correspond to the user input, such as where the user input includes a typographical or selection error or where no geoblogs exist that directly correspond to the provided user input.

The processor 12 may also continuously or repetitiously provide the current geographic location and user input to one or more of the computing devices 32 or other remote devices, and the computing devices 32 and other remote devices may automatically provide geoblogs that correspond to the current geographic location and the user input.

Further, the processor 12 may utilize the current geographic location and the user input to retrieve one or more geoblogs from the memory 16. For instance, the processor 12 may access a database stored within the memory 16 and retrieve geoblogs corresponding the current geographic location and the user input from the database. The processor 12 may retrieve geoblogs from the memory 16 generally simultaneously with the retrieval of geoblogs through the communications network. Thus, in embodiments where the device 10 is inoperable to access the communications network, geoblogs may be stored within the memory 16 for retrieval by the processor 12 independent of the communications network.

In step 106, navigation information is generated utilizing the retrieved geoblog or geoblogs. For instance, the processor 12 and/or the computing devices 32 may determine the position of a geoblog's stored geographic location in relation to the current geographic location, calculate a route from the current geographic location to a geoblog's stored geographic location, utilize the current geographic location and stored geographic locations to calculate the nearest or most convenient geoblogs, utilize a calculated route and stored geographic locations to determine geoblogs closest or most relevant to the calculated route, calculate a route that avoids a stored geographic location corresponding to a geoblog, combinations thereof, etc.

The navigation information may be easily generated while viewing or otherwise accessing a geoblog. For example, the user may function the user interface 18, such as by depressing one of the functionable inputs 28, while viewing a geoblog to cause the processor 12 to automatically generate a route from the current geographic location to the stored geographic location of the geoblog. Thus, the user is not required to transcribe or manually input a stored geographic location of a geoblog to enable the processor 12 to provide navigation-related functions.

As should be appreciated, the device 10 and/or the computing devices 32 may generate any type of navigation information utilizing retrieved geoblogs, and need not be limited to the specific examples articulated above.

In step 108, the retrieved geoblog and/or geoblogs are presented. Preferably, retrieved geoblogs are presented by the display 20 for consideration by a user. For example, the display 20 may present a representation of the geoblog in a similar manner to the exemplary geoblog shown in FIG. 5, where the stored geographic location and user-provided comment are displayed for easy viewing by the user.

Figure 6:
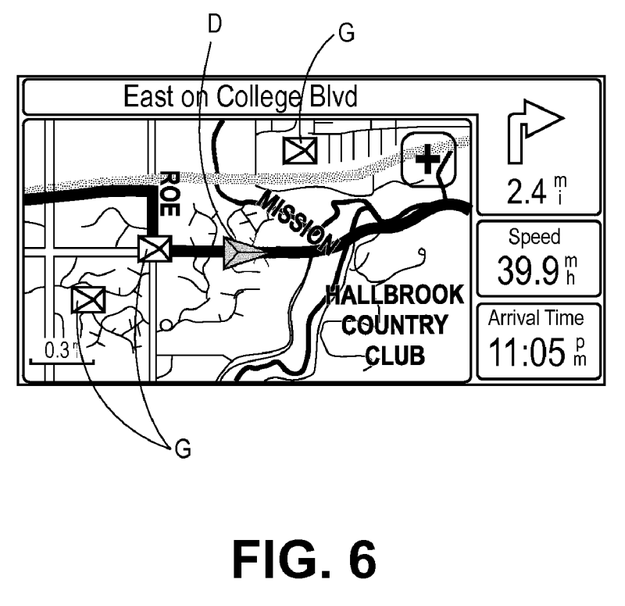
FIG. 6 is a sample screen display of the navigation device of FIGS. 1-2, the sample screen display showing a map including a plurality of geoblog indicators.

Further, the display 20 may present a representation of one or more geoblogs in relation to the current geographic location of the device 10, such as by presenting a map. For instance, the exemplary screen display shown in FIG. 6 presents the current device location D in relation to the stored geographic location of a plurality of geoblogs G. Such a configuration enables the user to easily identify geoblogs that are in proximity to the current geographic location of the device 10. In embodiments where geoblogs are presented on a map, user-provided comments associated with the geoblogs may be displayed along with a representation stored geographic location of each geoblog.

However, user-provided comments are preferably hidden from view when geoblogs are presented on a map such that the comments do not inhibit navigation or other device 10 features. In such embodiments, the user may touch or otherwise select one of the displayed geoblogs to reveal the associated user-provided comment. For instance, after selection of a particular geoblog, the display 10 may present a representation of the geoblog similar to the representation shown in exemplary FIG. 5. Thus, as the user and device 10 change position, geoblogs may be retrieved as described in step 104 and displayed in real-time by the display 20 on a map for consideration by the user. Should the user have an interest in a particular geoblog, he or she may select the geoblog to acquire more information, such as the user-provided comment, regarding the geoblog.

Figure 11:
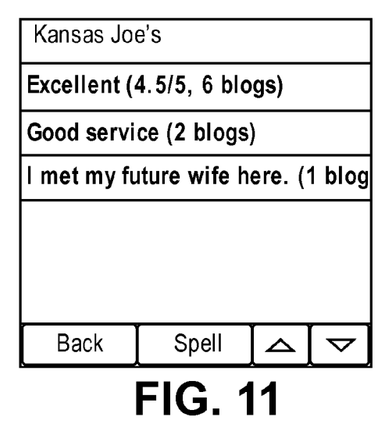
FIG. 11 is a sample screen display of the navigation device of FIGS. 1-2, the sample screen display showing a geoblog listing.

Further, where a plurality of retrieved geoblogs exist that correspond to the same general stored geographic location, such as where several users have provided a comment regarding a particular restaurant, the plurality of retrieved geoblogs may be presented on the display 20 with one icon or other indicator to limit user confusion and facilitate navigation. Upon selecting the icon or indicator corresponding to the plurality of geoblogs utilizing the user interface 18, each retrieved geoblog corresponding to the selected icon may be displayed with or without its corresponding user-provided comment in a listing, as shown in FIG. 11.

Figure 9:
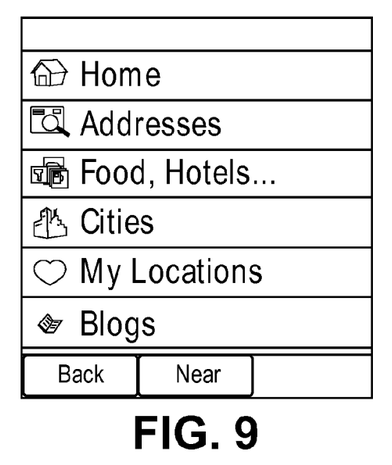
FIG. 9 is a sample screen display of the navigation device of FIGS. 1-2, the sample screen display showing a menu.
Figure 10:
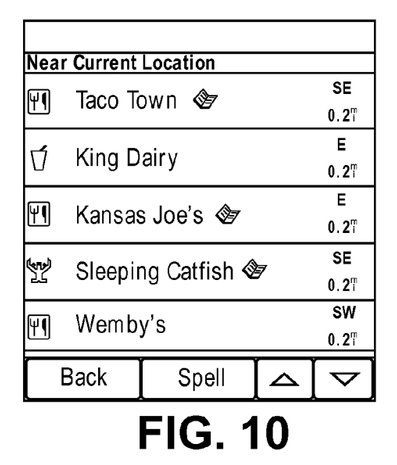
FIG. 10 is a sample screen display of the navigation device of FIGS. 1-2, the sample screen display showing a location listing.

Geoblogs may also be presented in a listing on the display 20, as is shown in the exemplary screen displays of FIGS. 9 and 10. The user may view the provided listing and function the user interface 18 to select one or more of the listed geoblogs. Upon selection of one or more of the listed geoblogs, information corresponding to the selected geoblogs may be presented, such as user-provided comments or a representation of stored geographic locations on a displayed map. Further, upon selection of one or more of the geoblogs, the device 10 may calculate navigation information corresponding to the selected geoblogs as discussed in step 106.

As is also shown in FIG. 10, the listing of geoblogs may be provided in combination with a listing of other geographic entities, such as a plurality of restaurants, and each geographic entity having a geoblog associated therewith may be listed with an icon to identify the existence of a geoblog. Such a configuration enables the user to be provided with conventional navigation functions and features in addition to an indication of the existence of geoblogs. Further, upon selection of the icon or other geoblog-related identifier, the device 10 may present a full indication of the geoblog, as is discussed above.

Preferably, the geoblogs presented by the listing correspond to the current geographic location of the device 10 and the user input acquired in step 102. For instance, should the user input correspond to a restaurant category, thereby indicating the user would like to access geoblogs corresponding to restaurants, the device 10 may retrieve restaurant-related geoblogs as discussed in step 106 and display a listing of the retrieved geoblogs for use by the user as shown in FIG. 10. Similarly, where many geoblogs exist, the device 10 may limit the displayed geoblogs to geoblogs or geographic entities that correspond to the user input and that have stored geographic locations in general proximity to the current geographic location of the device 10 acquired in step 100.

Alternatively, the device 10 may retain partial information related to the geoblogs, such as locations that have geoblogs associated therewith, and only retrieve all information corresponding to a particular geoblog when selected by the user from a listing.

Further, in situations where a selected or particular geographic location has more than one geoblog associated therewith, a combined listing or representation of all geoblogs associated with the particular location may be displayed. For instance, as shown in the exemplary screen display of FIG. 11, the selected geographic entity, Kansas Joe's, has 9 geoblogs associated therewith. The 9 geoblogs are combined into groupings according to their user-provided comments, such that the user is not bombarded with redundant information.

For instance, if the user-provided comments of plurality of geoblogs correspond to a star rating of the same restaurant location, the processor 12 may average the various star ratings and at least initially present only the averaged result to the user via the display 20. Such a configuration enables the user to easily access and view information without being forced to sort or view a multitude of similar geoblogs. Similarly, where geoblogs are commonly titled but include varying user-provided comments, the commonly titled geoblogs may be listed in a single entry with an indication of how many geoblogs are associated therewith, such as the "Good service" entry of FIG. 11.

The presented geoblogs may also be automatically formatted by the device 10 or the computing devices 32 for convenient use. For example, the device 10 may format geoblogs retrieved from the WWW for correct presentment on the display 20, such as by changing the resolution, font, color, etc, of various geoblog components. Further, user-provided comments associated with geoblogs may be automatically translated by the device 10 and/or the computing devices 32 into the user's particular language. For instance, the user input provided by the user in step 102 may correspond to the user's language and the device 10 may retrieve geoblogs corresponding to the language or translate geoblogs into the identified language for viewing by the user.

Steps 200-204 shown in FIG. 7 generally illustrate other features operable to be provided by various embodiments of the present invention. Steps 200-204 may be performed in combination with steps 100-108 or steps 200-204 may be performed independent of steps 100-108.

In step 200, a second user input is acquired for use in forming a geoblog. The second user input may be acquired in a similar manner to the first user input acquired in step 102, such as from the user interface 18 and/or the communications network. Further, the second user input may be the same as the first user input. However, the second user input preferably corresponds to a user-provided comment associated with the current geographic location of the device 10. Thus, steps 100 and 200 may be performed concurrently or simultaneously.

Figure 12:
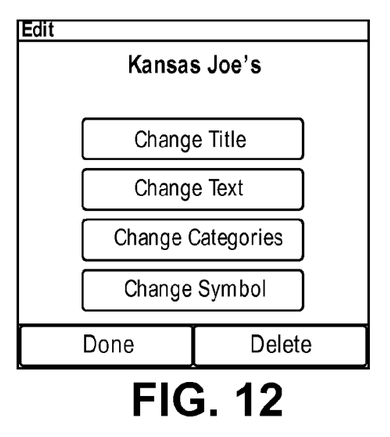
FIG. 12 is a sample screen display of the navigation device of FIGS. 1-2, the sample screen display showing a geoblog formation menu.

As shown in the exemplary screen display provided by FIG. 12, the second user input may correspond to any information related to a geographic location, such as a geographic location title, a geographic location category, a geographic location symbol, a geographic location comment such as a description of a geographic location, combinations thereof, etc. Thus, for instance, the second user input may correspond to a geoblog title, a geoblog category, a geoblog symbol, a geographic area, route, or range, an associated comment, combinations thereof, etc. Preferably, the second user input corresponds to at least a geoblog title and an associated comment. However, the second user input may correspond to any information or combination of information related to a geographic location.

The user may function the user interface 18 or provide information through the communications network to provide the second user input, such as by keying in a review of a particular restaurant or a description of a view at a particular location. As should be appreciated, the user need not be required to provide the second user input while at the geographic location to which the input corresponds. For instance, the user may store a geographic location in the memory, such as by functioning an input while positioned at geographic location, and then at a later time provide the second user input to form the desired geoblog.

Figure 13:
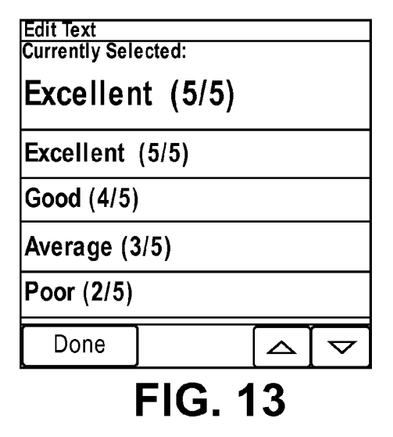
FIG. 13 is a sample screen display of the navigation device of FIGS. 1-2, the sample screen display showing a geoblog formation menu including a plurality of pre-defined comments.

Preferably, the second user input at least partially corresponds to a selection of pre-defined comments. For example, as shown in FIG. 13, a listing may be provided of various pre-defined comments associated with a particular geographic location and/or a user input, and the user may select one of the comments from the list without actually having to key or type in the letters comprising the selected entry. Thus, a user may quickly function the user interface 18 to provide the pre-defined comment, such as by selecting an "Excellent (5/5)" restaurant rating with the user interface 18, without requiring time consuming and manual text entry. Other pre-defined comments in addition to those shown in FIG. 13 may include good service, poor service, interesting, fun time, good view, good value, historic location, scenic spot, athletic event, new restaurant, etc. Selection of pre-defined comments additionally facilitates translation of the selected comments into desired formats or languages, as is discussed above in step 108. While use of pre-defined comments increases ease of geoblog creation and uniformity, free-form text and/or other custom entries may be used to increase flexibility.

In various embodiments, the second user input enables the device 10 to automatically generate a user-provided comment or other remark. Specifically, the user may function the user interface 18 to cause the device 10 to automatically provide a geoblog title corresponding to the current geographic location of the device 10 acquired in step 100. For instance, the memory 16 may comprise a database of geographic entities, where each entity corresponds to a geographic location and a name. For example, a geographic entity may correspond to a restaurant's geographic location and the name of the restaurant. The processor 12 may compare the current geographic location of the device 10 to geographic locations associated with geographic entities stored within the memory 16, such as points of interest (POIs) and waypoints, and automatically provide geoblog information corresponding to the current geographic location, such as the name of a restaurant or store corresponding to the current geographic location, etc. As should be appreciated, such a configuration enables users to rapidly create geoblogs based on an existing POI or other geographic entities and its associated information, thereby increasing the probability that information will be shared.

Further, the user may also be provided with a listing of geographic entities, areas, or regions that are in proximity to the current geographic location of the device 10 for selection. Thus, the user may easily function the user interface 18 to select a nearby entity to automatically generate the user-provided comment. For instance, the user may be provided with a listing of five nearby restaurants and may easily select one of the restaurants to automatically generate information corresponding to the selected restaurant for use in forming the geoblog, such as where the device 10 automatically creates a geoblog having a stored geographic location corresponding to the selected restaurant's location and a title corresponding to the name of the selected restaurant.

Figure 14:
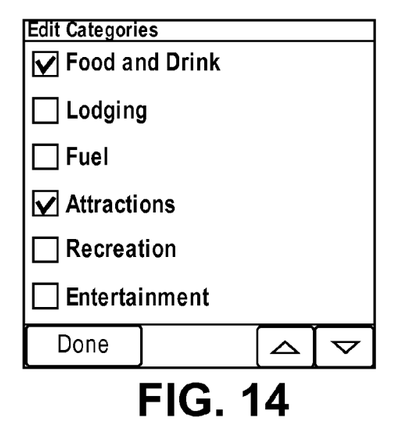
FIG. 14 is a sample screen display of the navigation device of FIGS. 1-2, the sample screen display showing a geoblog category listing.

The user may be provided with various listings of pre-defined comments associated with different types of comments, remarks, and/or categories, such as the geoblog category listing shown in the exemplary screen display of FIG. 14. For example, the user may select one or more geoblog categories that the formed geoblog will be associated with. By allowing users to select a pre-defined comment according to the second user input and by generally eliminating the tedious task of manually entering characters on a portable device, users are encouraged to provide inputs and form geoblogs for sharing with other users. As should be appreciated, by facilitating the creation of user-provided content, many geoblogs may be easily created by many discrete users for retrieval by devices as discussed in steps 100-108.

The second user input may also correspond to multi-media content such as images, videos, and audio information. For example, the user may function the user interface 18 to select from the memory 16 a particular photograph, drawing, video file, audio file such as spoken words, ambient sounds, and music, combinations thereof, etc, for utilization with or within the geoblog formed in step 202. In embodiments where the device 10 includes the camera 34 and/or the microphone 30, the second user input may correspond to a functioning of the camera 34 and/or microphone 30 to record or otherwise provide multi-media content for use with the geoblog. For example, the user may function the user interface 18 to record an image with the camera 34, and the processor 12 may store the recorded image in the memory 16 for use in step 202.

The second user input may also correspond to an access level to be utilized with the geoblog formed in step 202. For example, the access level may define which users or devices are entitled to view the formed geoblog. Such a configuration enables the user to create public and private geoblogs by allowing only selected devices or users to view private geoblogs.

In step 202, the geoblog is formed. Preferably, the geoblog is formed utilizing the current geographic location of the device 10 acquired in step 100 and the second user input acquired in step 200. For instance, the processor 12 may form a geoblog comprising a stored geographic location and a user-provided comment by associating the current geographic location of the device 10 with the stored geographic location and by associating the user-provided comment with the second user input.

As should be appreciated, the stored geographic location of the formed geoblog need not necessarily equate with the current geographic location of the device 10 as the stored geographic location may correspond to a plurality of geographic locations, a geographic range, a route, a geographic area, etc, that corresponds to the current geographic location of the device 10. Thus, for instance, in some embodiments the formed geoblog may include a stored geographic location corresponding to a geographic area as defined by the current geographic location of the device 10 and the second user input.

The geoblog is preferably formed generally simultaneously with the acquisition of the second user input to enable the current geographic location of the device 10 to be automatically associated with the second user input, as is described above in detail. However, steps 100, 200, and 202 may each occur at discrete times and the user may independently provide both the stored geographic location and the second user input without associating the stored geographic location with the current geographic location of the device 10.

As discussed above, the user-provided comment may be automatically provided partially or wholly by the device 10 by utilizing the current geographic location of the device 10 and data stored within the memory 16 and/or acquired through the communications network. Thus, in some embodiments the user may function the user interface 18 to select a pre-defined comment from a listing, as shown in FIG. 13, and the device 10 may utilize the current geographic location of the device 10 when the user functions the user interface 18 to form a geoblog comprising a stored geographic location corresponding to the current geographic location and a user-provided comment including both the selected pre-defined comment and a geoblog title automatically generated by the device 10 as discussed above.

In various embodiments, the user-provided comment may include multi-media content such as audio and video information as is also discussed above. Accordingly, the formed geoblog may similarly include images, such as drawings and photographs, videos, and sounds such as spoken words, ambient noises, and/or music.

The device 10 preferably forms the geoblog by arranging the stored geographic location and the user-provided comment in a readily sharable data format or formats. For instance, the device 10 may create a HTML document including data corresponding to the stored geographic location, provided by the current geographic location of the device, and the user-provided comment, provided by the second user input. Further, the formed geoblog may comprise a plurality of discrete files, such as HTML or text files, image filed such as bitmaps, graphic interchange formats (GIFs), joint photographic expert group formats (JPEGs), etc, video files such as moving picture expert group formats (MPEGs), audio files such as waveform audio files (WAVs), MPEG audio layer three files (MP3s), etc, combinations thereof, etc.

The formed geoblog is preferably stored within the memory 16 for later use or retrieval. However, in some embodiments the formed geoblog may be immediately provided to the communications network, as discussed below in step 204, without first being stored within the memory 16.

In step 204, the formed geoblog is provided to the communications network. For example, the device 10 may utilize the communications element 36 to upload the formed geoblog to one or more devices coupled with the communications network, such as other navigation devices or devices such as web and file services corresponding to the computing devices 32. The device 10 may transmit information to and through the communications network utilizing the communications element 36 and any data transport protocol.

In various embodiments, formed geoblogs may be provided in real time to the communications network for use by other devices. For instance, after formation of a geoblog in step 102, the formed geoblog may be immediately uploaded to the communications network.

However, in some embodiments formed geoblogs may be retained within the memory 16 and provided to the communications network at a later time. For instance, the device 10 may automatically upload geoblogs stored within the memory 16 each hour to the communications network, thereby limiting network traffic and device 10 usage. Similarly, in some embodiments the device 10 may retain geoblogs within the memory 16 until the communications network is accessible by the communications element 36. For instance, if the communications element 36 relies on IEEE 802.11 or a cellular network connection to connect to the communications network, the geoblogs may be retained within the memory 16 until the communications network becomes accessible. Such a configuration enables the user to create geoblogs in areas where access to the communications network is limited, such as rural or remote areas, and then automatically upload formed geoblogs at a more convenient time and location to the communications network.

Further, in some embodiments the device 10 may only provide geoblogs to the communications network in response to a user input. Thus, for example, the user may select one or more geoblogs from a listing presented by the display 20 and the user may function the user interface 18 to select one or more of the listed geoblogs for uploading to the communications network.

In some embodiments the device 10 may indirectly provide formed geoblogs to the communication network. For instance, in embodiments where the communications element 36 is not operable to access the communications network, formed geoblogs may be first sent to another computing device through a wired or wireless connection and then provided to the communications network. Similarly, formed geoblogs may be stored within the memory 16 and the memory 16 may be later accessed or otherwise provided to other devices for uploading stored geoblogs to the communications network. For instance, in embodiments where the memory 16 is removable, the user may remove the memory 16 and couple the removed memory 16 with a network capable device to provide the stored geoblogs to the communications network.

Preferably, the device 10 provides formed geoblogs to the communications network such that they are readily accessible by other devices and users though the communications network, such as the Internet. Thus, as discussed above, the geoblog is preferably formed in a readily-accessible format such that it may be easily shared between users. Further, the formed geoblogs are preferably provided to other devices such that may be easily searched and sorted by any device or user. For instance, the formed geoblogs are preferably provided through the communications network to an online database, such as GARMIN MOBILE, for easy access by other users and devices.

In some embodiments the device 10 may provide the formed geoblog to the communications network in an intermediate format, and devices coupled with the communications network, such as web and file servers, may convert the intermediate format into a readily accessible format.

Figure 8:
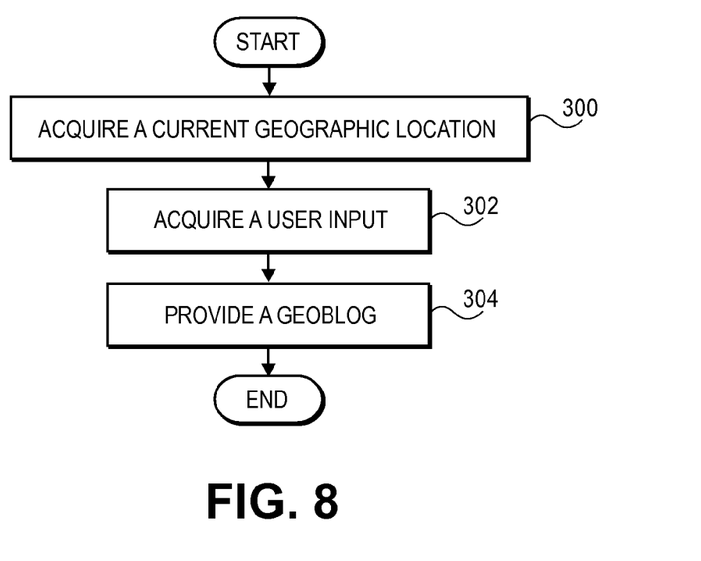
FIG. 8 is a flow chart showing some of the steps that may be performed by various alternative embodiments of the present invention.

Steps 300-304 shown in FIG. 8 generally illustrate other features operable to be provided by various embodiments of the present invention. In particular, steps 300-304 provide a method operable to provide a geoblog to a device and/or user according to a current geographic location and a user input. Steps 300-304 may be performed in combination with steps 100-108 or steps 200-204 may be performed independent of steps 100-108 and 200-204.

Further, steps 300-304 are not necessarily performed by the device 10 as they may be performed by the computing devices 32, or other similar elements, to provide a geoblog to the device 10 or other elements associated with the communications network or otherwise coupled with the computing devices 10.

In step 300, a current geographic location is acquired. The current geographic location may be acquired by the device 10 as discussed in step 100. Further, the current geographic location may be acquired through the communications network or by a direct user input. For instance, the device 10 may provide its current geographic location as determined by the location determining component 14 to the computing devices 32 through the communications network, the user may access the computing devices 32 through the communications network and identify his or her current geographic location utilizing information provided by the computing devices 32, such as an interactive map, etc.

In step 302, a user input is acquired. The user input acquired in step 302 is substantially similar to the user input acquired in step 104 and may be any input or combination of inputs that may be utilized to facilitate retrieval of a geoblog. The user input may be acquired from the device 10, through the communications network, by direct user input, etc.

In step 304, a geoblog is provided according to the geographic location acquired in step 300 and the user input acquired in step 302. Preferably, the geoblog is provided by one of the computing devices 32 through the communications network to the device 10. However, the geoblog may be provided from any device to any other device or user utilizing the acquired geographic location and user input.

Preferably, the geoblog is provided by identifying one or more geoblogs that correspond to the acquired geographic location and user input. For instance, one of the computing devices 32 may include a database of geoblogs and the computing device 32 may search or sort the database of geoblogs to locate geoblogs that correspond to the acquired geographic location and/or the user input.

For instance, one of the computing devices 32 may identify geoblogs that have stored geographic locations that correspond to the acquired geographic location, such as where the acquired geographic location corresponds to a geographic range or position indicated by the stored geographic location. Similarly, one of the computing devices 32 may search or sort the database of geoblogs to identify geoblogs that include stored geographic locations or user-provided comments that correspond to the user input. For instance, if the user input is a geoblog category, the computing device may locate geoblogs corresponding to that category. Similarly, the computing device may locate geoblogs that correspond to both the user input and the acquired geographic location, such as geoblogs that correspond to a selected category within a range from the acquired geographic location. The identified geoblogs are then provided through the communications network to various devices or users.

The combination of the device 10 and computing devices 32 as discussed above enables the rapid retrieval of relevant geoblogs. For instance, the device 10 may be utilized to perform steps 100 through 108, while the computing devices 32 may perform steps 300 through 304 to enable the device 10 to retrieve a geoblog as discussed in step 104. Such a configuration enables the device 10 to access a plurality of geoblogs without being specifically required to store, search, or sort the geoblogs itself. Further, such a configuration enables the device 10 to access many computing devices 32 to efficiently retrieve geoblogs from many different sources.

It can be appreciated that geographic entities, such as POIs and waypoints, may now be used to seed geoblogs. For example, POIs and waypoints often include names and location data that the present invention can incorporate into a geoblog, or otherwise use to create a geoblog. However, typical POIs and waypoints are very different from the geoblogs used by various embodiments of the present invention. Specifically, POIs are typically not presented in modifiable form, and therefore only include information provided by a supplier rather than users. Furthermore, POIs are typically not shared between users. Rather, they are simply provided by a supplier to individual users. While waypoints are typically created by users, they are only used by the individual user who created them. Specifically, typical waypoints are simply not shared among groups of users.

In contrast, geoblogs are preferably designed to be created by users of the device 10 and shared among users of the device 10 or other similar devices. Preferably, the geoblogs are designed to be shared among large groups of users, many of which will not be known to each other and may have no contact other than through the geoblogs themselves. In fact, in some embodiments, the device 10 of the present invention can automatically share geoblogs among anonymous users. Specifically, the device 10 may automatically upload geoblogs to the communications network upon their creation and/or modification. Similarly, the device 10 may automatically download geoblogs from the communications network. Furthermore, as discussed above, downloading geoblogs may be done based on location, route, destination, category, keyword, and/or other criteria. This feature is a significant advance over the prior art in that a user is not required to download large numbers of waypoints or POIs that they may not be interested in, thereby more efficiently using available bandwidth and storage capabilities of communications network and the device 10. Thus, their ability to be created, shared, and appended by users greatly aids in their function as a communications tool between users.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A navigation device comprising:
   a location determining component operable to determine a current geographic location of the device;
   a memory;
   a display operable to present a listing of a plurality of pre-defined comments stored within the memory, wherein the pre-defined comments are associated with a particular geographic location in proximity to the current geographic location of the device;

a user interface operable to be functioned by a user to select one of the presented pre-defined comments; and a processor coupled with the memory, the location determining component, the display, and the user interface, the processor operable to form a geoblog utilizing the current geographic location of the device and the selected pre-defined comment and store the formed geoblog within the memory.

2. The device of claim 1, wherein the pre-defined comments are presented according to the current geographic location of the device.

3. The device of claim 1, wherein the pre-defined comments are displayed based upon a user-selected geoblog category.

4. The device of claim 1, wherein the pre-defined comments are displayed in a user-selected language.

5. The device of claim 1, wherein the processor automatically titles the formed geoblog utilizing the current geographic location of the device.

6. The device of claim 1, further including a communications element coupled with the processor to enable the processor to communicate with a communications network to provide the formed geoblog to an external source.

* * * * *